US012721364B2

(12) United States Patent
Tulloch et al.

(10) Patent No.: US 12,721,364 B2
(45) Date of Patent: Sep. 1, 2026

(54) FREMYELLA DIPLOSIPHON AS A NUTRITIONAL FEED SUPPLEMENT FOR AQUACULTURE

(71) Applicant: Morgan State University, Baltimore, MD (US)

(72) Inventors: Ingrid Tulloch, Baltimore, MD (US); Viji Sitther, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 396 days.

(21) Appl. No.: 18/371,602

(22) Filed: Sep. 22, 2023

(65) Prior Publication Data

US 2024/0099333 A1 Mar. 28, 2024

Related U.S. Application Data

(60) Provisional application No. 63/408,920, filed on Sep. 22, 2022.

(51) Int. Cl.

| | |
|---|---|
| ***A23K 10/18*** | (2016.01) |
| ***A01K 61/54*** | (2017.01) |
| ***A01K 61/59*** | (2017.01) |
| ***A23K 50/80*** | (2016.01) |

(52) U.S. Cl.
CPC .............. *A23K 10/18* (2016.05); *A01K 61/54* (2017.01); *A01K 61/59* (2017.01); *A23K 50/80* (2016.05)

(58) Field of Classification Search
None
See application file for complete search history.

(56) References Cited

U.S. PATENT DOCUMENTS

2019/0071699 A1* 3/2019 Sitther .................. C12N 15/74

FOREIGN PATENT DOCUMENTS

CN 110012967 A * 7/2019 ............ A23K 10/22

* cited by examiner

*Primary Examiner* — Michelle F. Paguio Frising
(74) *Attorney, Agent, or Firm* — Whiteford, Taylor & Preston, LLP; Peter J. Davis

(57) ABSTRACT

A method for improving aquaculture growth and/or survival rate and hemocyte viability, comprising growing the aquaculture in the presence of cyanobacteria *F. diplosiphon*. The aquaculture may be a shellfish aquaculture, for example, shrimp, crayfish, oysters, clams, mussels, and crabs or combinations thereof. The aquaculture may be freshwater aquaculture, brackish aquaculture, or saltwater aquaculture. The *F. diplosiphon* may be a wild-type or an engineered/recombinant strain. The *F. diplosiphon* may be preferably added to aquacultures in amounts of 1 million colony forming units or more per ml of aquaculture volume.

14 Claims, 4 Drawing Sheets

FREMYELLA DIPLOSIPHON AS A NUTRITIONAL FEED SUPPLEMENT FOR AQUACULTURE

FIELD OF THE INVENTION

This invention relates to organic feedstock supplements for aquaculture.

BACKGROUND OF THE INVENTION

*Fremyella diplosiphon* (*F. diplosiphon*) is a freshwater cyanobacterium that is unique in that it features a light-dependent acclimation process known as a complementary chromatic adaptation that enables the organism to a grow in a wide range of environmental light conditions, including light intensities as low as 15 μmol $m^{-2}$ $s^{-1}$. While *F. diplosiphon* has been proposed as a potential source for biofuel production, there has been no indication or suggestion prior to the work presented herein that it might be suitable as a feedstock or supplement for aquaculture.

SUMMARY OF THE INVENTION

The present invention is an *F. diplosiphon*-based feedstock that contains substantial protein content for promoting growth, survival, and reproductive success of cultured crayfish and other freshwater crustaceans. More specifically, *F. diplosiphon*, is shown here to be useful as a feedstock supplement to spur growth and survival of the red swamp crayfish (*Procambarus clarkii*). Growth and survival of the adult and juvenile crayfish were measured over a four-month period to assess the effect of *F. diplosiphon* as a nutritional supplement (versus control conditions) for crayfish raised in an artificial environment.

Laboratory crayfish raised in artificial pond water ("APW") supplemented with *F. diplosiphon* cultures showed increased growth and hemocyte viability as compared to control (APW only) suggesting a potential role in crayfish immune defense. These crayfish also reproduced, which is typically challenging in a laboratory setting. Analysis of *F. diplosiphon*'s nutrient profile has shown that this cyanobacterium has a wide range of macromolecules. The percent protein, carbohydrate and fat per gram appears to be twice the percent nutrient per gram found in standard crayfish and lobster food. Thus, cyanobacteria *F. diplosiphon* is presented herein as a supplement to and/or replacement for standard aquaculture feed.

Accordingly, there is presented a method for improving aquaculture growth and/or survival rate, comprising growing said aquaculture in the presence of cyanobacteria *F. diplosiphon*. According to various embodiments of the invention, the aquaculture may be a shellfish aquaculture, for example, shrimp, crayfish, oysters, clams, mussels, and crabs or combinations thereof. The aquaculture may be freshwater aquaculture, brackish aquaculture, or saltwater aquaculture.

The *F. diplosiphon* used according to the invention may be any wild-type or engineered/recombinant strain. Wild type strains that may be used according to the invention may include, for example, SF-33, B481-WT. Engineered/recombinant strains that may be used according to the invention may include, for example, halotolerant strains HSF33-1 and HSF33-2 (see, e.g., U.S. Pat. No. 10,626,363, the entirety of which is incorporated herein by reference), enhanced lipid producing strain B481-SD (see, e.g., U.S. Pat. No. 10,793,883, the entirety of which is incorporated herein by reference), and/or UV-tolerant strain B481-ViAnSa (see, e.g., U.S. patent application Ser. No. 17/891,482, the entirety of which is incorporated herein by reference).

According to various embodiments, the *F. diplosiphon* may be preferably added to aquacultures in amounts of 1 million colony forming units or more per ml of aquaculture volume. *F. diplosiphon*-supplemented aquaculture may show increased weight gain, increased size, increased survival and mean growth, and/or increased hemocyte viability as compared to non-*F. diplosiphon* supplemented aquaculture grown under otherwise identical culture conditions.

DETAILED DESCRIPTION OF THE INVENTION

An artificial pond water solution was created in a laboratory setting for the crayfish tanks. The APW was created with reverse osmosis water and API Aquarium Salt. The API Aquarium salt was added to reverse osmosis filtered water at a concentration of 1 tablespoon per 20 L. The APW solution was stored and used for all crayfish tanks.

Stock solution of *F. diplosiphon* (wild type strain SF33) cultures was prepared by establishing fresh seed cultures in Petri plates containing solid BG-11 cyanobacterial medium (Allen, 1968) supplemented with 20 mM HEPES buffer for seven days. Subsequently, the seed cultures were inoculated into liquid BG-11 medium in flasks and subjected to continuous shaking at 170 rpm and a temperature of 28° C. for a duration of seven days. Once established, *F. diplosiphon* stock solution was maintained for use with the experimental group.

Fifty-three adult and twenty-two juvenile *P. clarkii* crayfish were obtained from Carolina Biological Supply Company (Burlington, NC, USA).

Sixteen adults, half male, and half female, were placed in the experimental group, and the remaining 37 adults, 9 female, and 18 male, were placed in the control group. The experimental group also included eight of the twenty two juveniles. The remaining fourteen juveniles were placed in the control group. Crayfish were housed in pairs sharing the same condition and sex. Crayfish were given one week to get acclimated to the facility before the start of the study.

All crayfish were fed three Tetra Pond Food (for goldfish and koi) pellets every other day, a Tetra Vitamin C supplement flake weekly, and had aquaria water changed every two weeks. Every two weeks, samples of the *F. diplosiphon* stock solution were measured for optical density readings at 750 nm (ranging from 0.5-0.75), diluted to 0.1 OD in artificial pond water and added to the tanks holding the experimental group in an amount of 1 million colony forming units ("CFUs") per ml of APW.

Surviving crayfish were measured weekly for weight (g) and carapace length (mm). In addition, tank water in each experimental and control tank was evaluated weekly for 16 chemical parameters to assess the consistency of water quality. This procedure was repeated for 4 months. At the end of the study, descriptive statistics of the mean growth (weight and carapace length) and percent survival were calculated.

Figure 2:
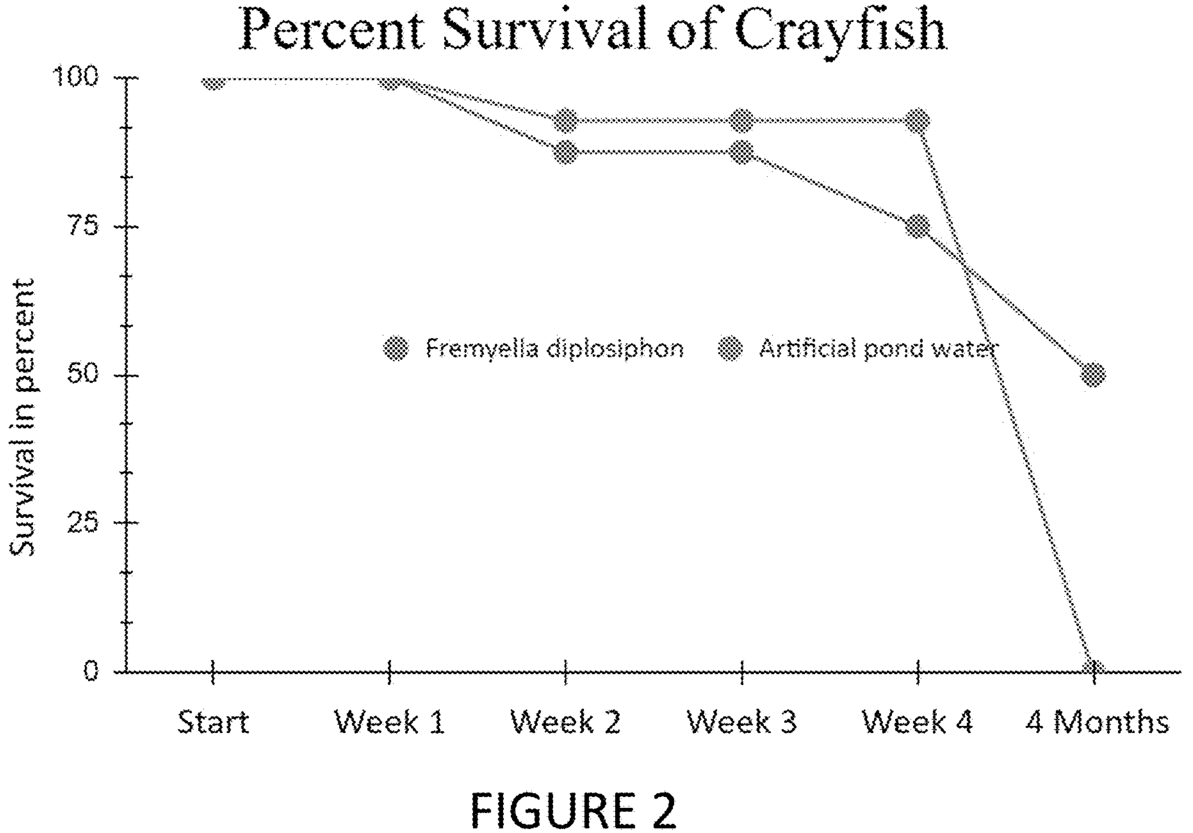
FIG. 2 is a chart showing survival rate of crayfish on the two different feedstocks.
Figure 3:
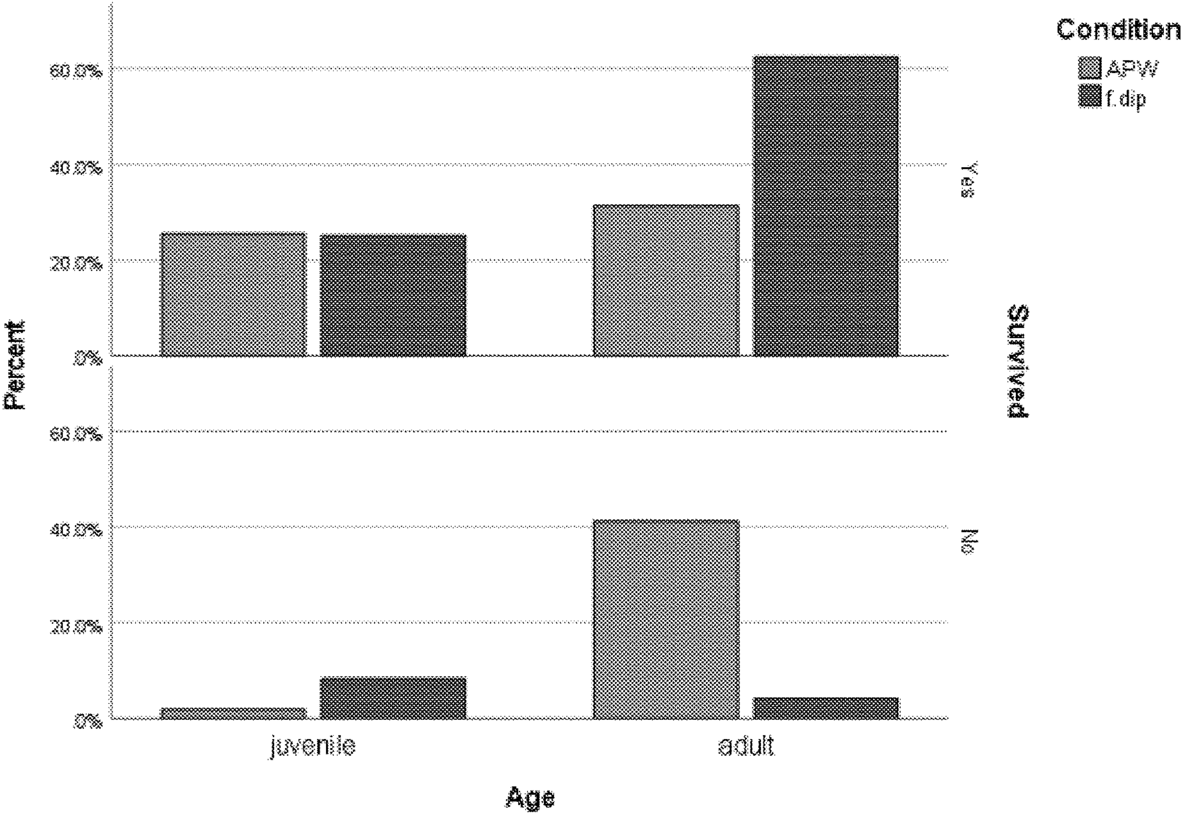
FIG. 3 is a chart showing survival rates of crayfish on the two different feedstocks, by age.

To determine whether differences in survival and growth between control and experimental groups were significant, two-way ANOVA by age (juvenile versus adult)×condition (control versus experimental group) and independent sample t-tests were conducted for significant ANOVA, Independent sample t-tests were also conducted for within-group differences per condition. Results are summarized in FIGS. 1-3.

Figure 1:
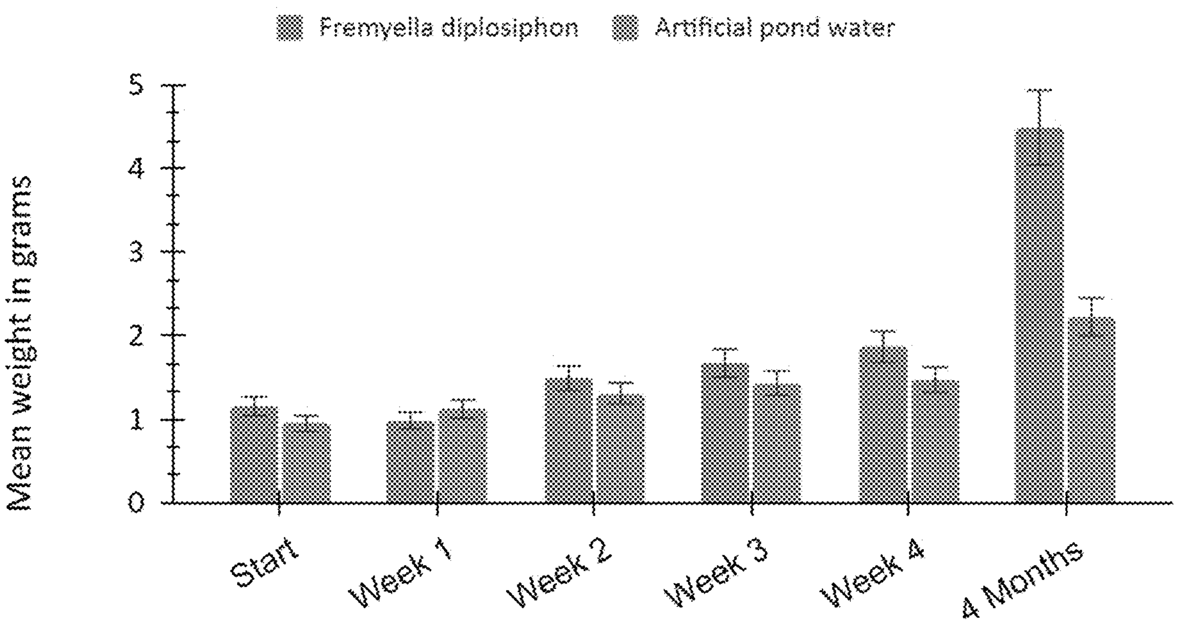
FIG. 1 is a chart showing weight gain of crayfish on the two different feedstocks, artificial pond water ("APW") and APW supplemented with *F. diplosiphon*

At week 1, the control crayfish had a mean weight of 1.124 g (SD=0.86) compared to the experimental (*F. diplosiphon* supplemented) crayfish weighing 0.984 g, on average (SD=0.75), FIG. 1. Also, at week 1, the survival of both groups was 100%, FIG. 2. By week 2, the control crayfish had a mean weight of 1.309 g (SD=0.80) compared to the experimental crayfish's mean weight of 1.492 g (SD=0.73), FIG. 1. By week 3, experimental crayfish had a mean weight of 1.67 g (SD=1.065) compared to control crayfish with 1.44 g (SD=1.06), FIG. 1. By week 3, survival rates had not changed in either group, FIG. 2. At week 4, control crayfish retained the survival rate of 92.5%, while the experimental crayfish had a decline in survival to 75%, FIG. 2. In the same week, experimental crayfish had a mean weight of 1.87 g (SD=0.935) compared to control crayfish with 1.48 g (SD=1.14), which only increased by 0.04 g, FIG. 1. However, by month 4, only one control crayfish had survived with a survival rate of 12.5%, FIG. 2 and FIG. 3. This was compared to the 4 surviving experimental crayfish, giving the experimental group a survival rate of 50%, FIG. 2. By month 4, the experimental crayfish had also grown larger with a mean weight of 4.4875 g (SD=1.69) compared to the only surviving control crayfish weighing 2.23 g, FIG. 1.

Figure 4:
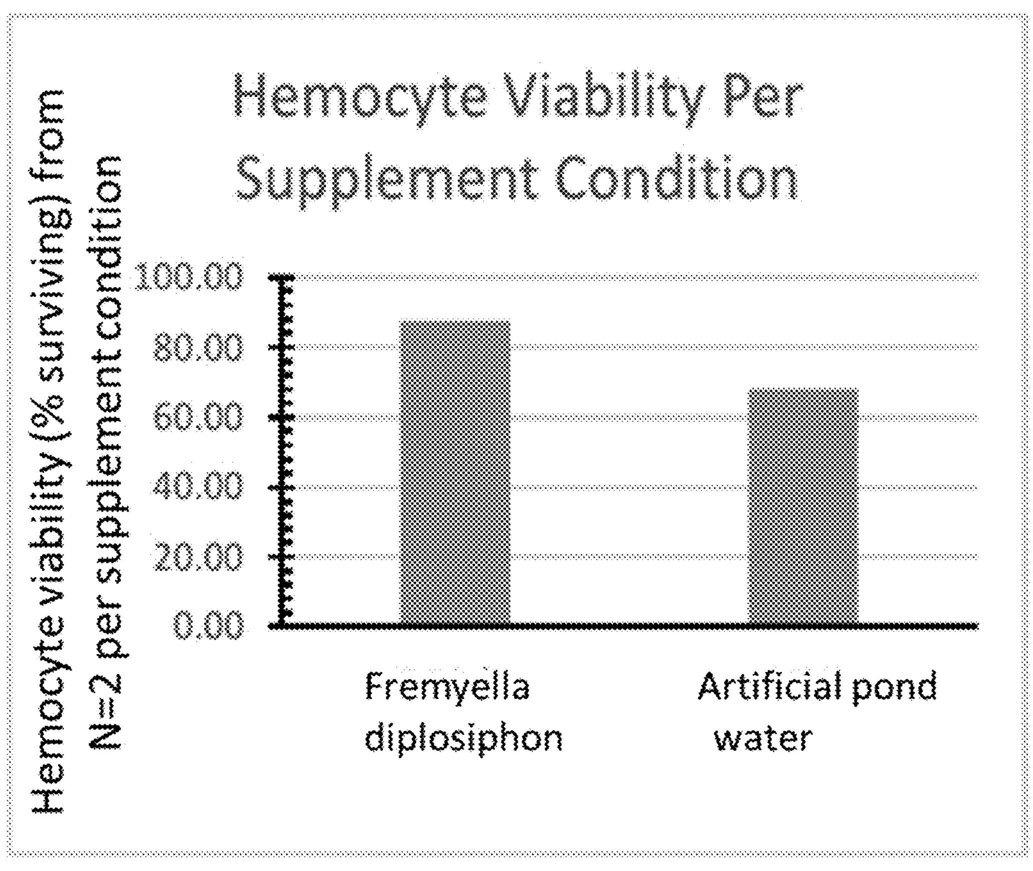
FIG. 4 is a chart showing hemocyte viability of crayfish on the two different feedstocks.

Hemocyte viability was also measured between a control set of crayfish (in APW), and a set of crayfish in *F. diplosiphon*-supplemented APW. The experimental group showed hemocyte viability of greater than 80% compared to hemocyte viability of just over 60% for the control group, FIG. 4.

These results indicate that *F. diplosiphon* is a strong candidate for food source or supplement for improving the survival and growth of freshwater aquacultures. In addition, strains of *F. diplosiphon* that have been engineered to have higher salt tolerances will be useful for brackish and even saltwater aquacultures.

The invention claimed is:

1. A method for improving aquaculture growth and/or survival rate, comprising growing said aquaculture with live cyanobacteria *Fremyella diplosiphon* (*F. diplosiphon*).

2. The method according to claim 1, wherein said aquaculture is a shellfish aquaculture.

3. The method according to claim 2, wherein said shellfish is shrimp, crayfish, oysters, clams, mussels, and crabs or combinations thereof.

4. The method according to claim 1, wherein said aquaculture is freshwater aquaculture, brackish aquaculture, or saltwater aquaculture.

5. The method according to claim 1, wherein said *F. diplosiphon* is a wild-type *F. diplosiphon*.

6. The method according to claim 5, wherein said wild-type *F. diplosiphon* is selected from the group consisting of SF-33 and B481-WT.

7. The method according to claim 1, wherein said *F. diplosiphon* is a recombinant *F. diplosiphon*.

8. The method according to claim 7, wherein said recombinant *F. diplosiphon* is selected from the group consisting of B481-SD, HSF33-1, HSF33-2, and B481-ViAnSa.

9. The method according to claim 1, wherein said *F. diplosiphon* is added to said aquaculture in amounts of 1 million colony forming units or more per ml of aquaculture volume.

10. The method according to claim 1, wherein said aquaculture shows increased weight gain as compared to non-*F. diplosiphon* supplemented aquaculture grown under otherwise identical culture conditions.

11. The method according to claim 1, wherein said aquaculture shows increased growth in length as compared to non-*F. diplosiphon* supplemented aquaculture grown otherwise identical culture conditions.

12. The method according to claim 1, wherein said aquaculture shows increased survival and mean growth as compared to non-*F. diplosiphon* supplemented aquaculture grown under otherwise identical culture conditions.

13. The method according to claim 1, wherein said aquaculture shows increased hemocyte viability as compared to non-*F. diplosiphon* supplemented aquaculture grown under otherwise identical culture conditions.

14. The method according to claim 1, comprising cultivating live cultures of *F. diplosiphon* and adding said live cultures of *F. diplosiphon* directly to the aquaculture environment.

* * * * *